US009879349B2

(12) United States Patent
Kolberg et al.

(10) Patent No.: US 9,879,349 B2
(45) Date of Patent: *Jan. 30, 2018

(54) METHOD FOR COATING METALLIC SURFACES WITH AN AQUEOUS COMPOSITION

(75) Inventors: Thomas Kolberg, Heppenheim (DE); Manfred Walter, Linsengericht (DE); Peter Schubach, Nidderau (DE)

(73) Assignee: Chemetall GmbH, Frankfurt (DE)

( * ) Notice: Subject to any disclaimer, the term of this patent is extended or adjusted under 35 U.S.C. 154(b) by 1038 days.

This patent is subject to a terminal disclaimer.

(21) Appl. No.: 13/326,633

(22) Filed: Dec. 15, 2011

(65) Prior Publication Data
US 2012/0177826 A1 Jul. 12, 2012

Related U.S. Application Data

(60) Continuation-in-part of application No. 12/082,841, filed on Apr. 15, 2008, now Pat. No. 8,101,232, which is a division of application No. 10/985,652, filed on Nov. 10, 2004, now abandoned, said application No. 13/326,633 is a continuation of application No. 11/667,091, filed as application No. PCT/EP2005/011953 on Nov. 9, 2005, now Pat. No. 8,182,874, which is a continuation-in-part of application No. 10/985,652, filed on Nov. 10, 2004, now abandoned.

(30) Foreign Application Priority Data

Apr. 4, 2005 (DE) .................. 10 2005 015 573
Apr. 4, 2005 (DE) .................. 10 2005 015 575
Apr. 4, 2005 (DE) .................. 10 2005 015 576

(51) Int. Cl.
| *B05D 3/00* | (2006.01) |
| *B05D 7/00* | (2006.01) |
| *C09D 1/00* | (2006.01) |
| *C23C 26/00* | (2006.01) |
| *C09D 5/08* | (2006.01) |
| *C23C 18/12* | (2006.01) |
| *C23C 18/14* | (2006.01) |
| *C23C 22/34* | (2006.01) |
| *C23C 22/36* | (2006.01) |
| *B05D 3/04* | (2006.01) |

(52) U.S. Cl.
CPC .............. *C23C 26/00* (2013.01); *B05D 3/007* (2013.01); *B05D 3/0413* (2013.01); *B05D 7/52* (2013.01); *C09D 1/00* (2013.01); *C09D 5/08* (2013.01); *C23C 18/122* (2013.01); *C23C 18/1241* (2013.01); *C23C 18/14* (2013.01); *C23C 22/34* (2013.01); *C23C 22/364* (2013.01); *C23C 22/365* (2013.01); *C23C 22/367* (2013.01); *C23C 22/368* (2013.01); *C23C 2222/20* (2013.01); *Y02T 50/67* (2013.01); *Y10T 428/273* (2015.01); *Y10T 428/31529* (2015.04); *Y10T 428/31663* (2015.04)

(58) Field of Classification Search
CPC ............... B05D 3/00; B05D 7/00; C09D 1/00
USPC ........ 427/407.1, 352, 405; 106/287.1, 286.4, 106/286.8, 287.12, 286.1; 524/513, 130, 524/284
See application file for complete search history.

(56) References Cited

U.S. PATENT DOCUMENTS

| 4,063,016 A | 12/1977 | Austin |
| 4,112,151 A | 9/1978 | Cooke |
| 4,311,738 A | 1/1982 | Chi |
| 4,452,918 A | 6/1984 | Uchida et al. |
| 4,457,790 A | 7/1984 | Lindert et al. |
| 4,617,056 A | 10/1986 | Mosser et al. |
| 4,669,394 A | 4/1987 | Hera et al. |
| 4,959,180 A | 9/1990 | Armes et al. |
| 4,986,886 A | 1/1991 | Wei et al. |
| 5,053,081 A | 10/1991 | Jacob |
| 5,108,793 A | 4/1992 | van Ooij et al. |
| 5,174,867 A | 12/1992 | Naarmann et al. |
| 5,246,507 A | 9/1993 | Kodama et al. |
| 5,324,545 A | 6/1994 | Flamme |
| 5,415,893 A | 5/1995 | Wiersma et al. |
| 5,451,431 A | 9/1995 | Purnell et al. |
| 5,482,655 A | 1/1996 | Vogel et al. |
| 5,531,820 A | 7/1996 | Gorecki |
| 5,593,731 A | 1/1997 | Akagi et al. |
| 5,700,523 A * | 12/1997 | Petrole ..................... B05D 7/51 148/243 |

(Continued)

FOREIGN PATENT DOCUMENTS

| CA | 1211406 | 9/1986 |
| CN | 1195025 C | 3/2005 |

(Continued)

OTHER PUBLICATIONS

Assaf Favai Hassan "Inhibiting Effects of Group 6 Oxo-Anions on the Pitting Corrosion of Tin in Citrate-Chloride Solution", *Bull. Chem. Soc. Jpn.*,73 (2000), pp. 561-568.

(Continued)

*Primary Examiner* — William P Fletcher, III
(74) *Attorney, Agent, or Firm* — Armstrong Teasdale LLP

(57) ABSTRACT

The invention relates to a process for coating metallic surfaces with a composition containing at least one of a silane, silanol, siloxane or polysiloxane that is capable of condensation, water and optionally an organic solvent. The composition also contains compound containing Ti, Hf, Zr, Al or B; and at least one type of cation or an organic compound d) selected from monomers, oligomers, polymers, copolymers and block copolymers. The coating freshly applied with this composition is rinsed with a fluid and is not dried thoroughly before this rinsing step so that the compound capable of condensation does not condense substantially before the rinsing step.

9 Claims, No Drawings

(56) References Cited

U.S. PATENT DOCUMENTS

| | | |
|---|---|---|
| 5,868,820 A | 2/1999 | Claffey |
| 5,885,711 A | 3/1999 | Clarisse et al. |
| 5,905,109 A | 5/1999 | Shimizu et al. |
| 5,968,417 A | 10/1999 | Wiswanathan |
| 6,051,670 A | 4/2000 | Ahmed et al. |
| 6,054,514 A | 4/2000 | Kulkami et al. |
| 6,068,711 A | 5/2000 | Lu et al. |
| 6,132,645 A | 10/2000 | Hedges |
| 6,180,177 B1 | 1/2001 | Nagashima et al. |
| 6,203,854 B1 | 3/2001 | Affinito |
| 6,319,351 B1 | 11/2001 | Dixon |
| 6,328,874 B1 | 12/2001 | Kinlen et al. |
| 6,458,219 B2 | 10/2002 | Chihara et al. |
| 6,478,886 B1 | 11/2002 | Kunz et al. |
| 6,482,274 B2 | 11/2002 | Shimakura et al. |
| 6,514,357 B1 | 2/2003 | Tada et al. |
| 6,572,983 B2 | 6/2003 | Shimakura et al. |
| 6,589,324 B2 | 7/2003 | Kamo et al. |
| 6,596,835 B1 | 7/2003 | Brown et al. |
| 6,623,791 B2 | 9/2003 | Sadvary |
| 6,649,273 B2 | 11/2003 | Iwato et al. |
| 6,794,046 B1 | 9/2004 | Kurze et al. |
| 6,805,756 B2 | 10/2004 | Claffey et al. |
| 6,875,478 B2 | 4/2005 | Jung et al. |
| 6,875,479 B2 | 4/2005 | Jung et al. |
| 6,875,514 B2 | 4/2005 | Sormani et al. |
| 6,942,899 B2 | 9/2005 | Kendig et al. |
| 7,033,673 B2 | 4/2006 | Wiedemann et al. |
| 7,344,607 B2 | 3/2008 | Melzer et al. |
| 7,452,428 B2 | 11/2008 | Koch et al. |
| 7,510,612 B2 | 3/2009 | Matsukawa et al. |
| 8,101,232 B2 | 1/2012 | Eriksson et al. |
| 2001/0012078 A1 | 8/2001 | Hira et al. |
| 2001/0031416 A1 | 10/2001 | Everaars et al. |
| 2001/0031811 A1 | 10/2001 | Li et al. |
| 2002/0091195 A1 | 7/2002 | Paar et al. |
| 2003/0185990 A1 | 10/2003 | Bittner et al. |
| 2004/0022950 A1 | 2/2004 | Jung et al. |
| 2004/0022951 A1 | 2/2004 | Maurus et al. |
| 2004/0029395 A1 | 2/2004 | Zhang et al. |
| 2004/0054044 A1 | 3/2004 | Bittner et al. |
| 2004/0062873 A1 | 4/2004 | Jung et al. |
| 2004/0065389 A1 | 4/2004 | Kolberg et al. |
| 2004/0129346 A1 | 7/2004 | Kolberg et al. |
| 2004/0149961 A1 | 8/2004 | Konuma et al. |
| 2004/0149963 A1 | 8/2004 | Sinko et al. |
| 2004/0167266 A1 | 8/2004 | Hasegawa et al. |
| 2004/0168748 A1 | 9/2004 | Hartwig et al. |
| 2004/0170840 A1* | 9/2004 | Matsukawa ............ C23C 22/34 428/422.8 |
| 2005/0037208 A1 | 2/2005 | Ogino et al. |
| 2006/0093755 A1 | 5/2006 | Bittner et al. |
| 2006/0099429 A1 | 5/2006 | Domes et al. |
| 2006/0127681 A1 | 6/2006 | Domes et al. |
| 2007/0298174 A1 | 12/2007 | Kolberg et al. |
| 2008/0127859 A1 | 6/2008 | Kolberg et al. |
| 2008/0138615 A1 | 6/2008 | Kolberg et al. |
| 2008/0171211 A1 | 7/2008 | Ptieth et al. |
| 2008/0175992 A1 | 7/2008 | Plieth et al. |
| 2008/0286470 A1 | 11/2008 | Matsukawa et al. |
| 2008/0305341 A1 | 12/2008 | Plieth et al. |
| 2010/0038250 A1 | 2/2010 | Matsukawa et al. |
| 2011/0039115 A1 | 2/2011 | Domes et al. |

FOREIGN PATENT DOCUMENTS

| | | |
|---|---|---|
| DE | 31 51 115 | 9/1982 |
| DE | 41 33 102 A1 | 4/1993 |
| DE | 41 38 218 | 5/1993 |
| DE | 43 34 628 | 1/1995 |
| DE | 198 14 605 A1 | 10/1999 |
| DE | 100 16 181 A1 | 11/2000 |
| DE | 199 19 261 A1 | 11/2000 |
| DE | 199 56 383 A1 | 5/2001 |
| DE | 101 49 148 A1 | 5/2002 |
| DE | 10 308 237 A1 | 9/2004 |
| EP | 0 153 973 A1 | 9/1985 |
| EP | 0 492 306 A2 | 7/1992 |
| EP | 0 687 715 A2 | 12/1994 |
| EP | 0 676 420 B1 | 10/1995 |
| EP | 0 824 127 A2 | 2/1998 |
| EP | 0 949 353 A1 | 10/1999 |
| EP | 0 952 193 A1 | 10/1999 |
| EP | 1 130 132 A2 | 9/2001 |
| EP | 1 130 133 A2 | 9/2001 |
| EP | 1 146 144 A11 | 10/2001 |
| EP | 1 455 002 A1 | 12/2003 |
| EP | 1 382 721 A | 1/2004 |
| EP | 1 426 466 A1 | 6/2004 |
| EP | 1 433 875 A1 | 6/2004 |
| EP | 1 433 876 A1 | 6/2004 |
| EP | 1 433 877 A1 | 6/2004 |
| EP | 1 433 878 A1 | 6/2004 |
| EP | 1 051 478 B1 | 11/2004 |
| EP | 1 812 620 B1 | 8/2007 |
| EP | 1 390 564 B1 | 2/2009 |
| GB | 1 528 715 | 10/1978 |
| JP | 52-117930 | 10/1977 |
| JP | 52-135340 | 11/1977 |
| JP | 64-25995 | 1/1989 |
| JP | 10-046393 | 2/1998 |
| JP | 11-106945 | 4/1999 |
| JP | 2001-192852 | 7/2001 |
| JP | 2001-311037 | 11/2001 |
| JP | 2001-329379 | 11/2001 |
| JP | 2004-218070 | 8/2004 |
| JP | 2004-218075 | 8/2004 |
| JP | 2004-527654 A | 9/2004 |
| JP | 2005-008982 | 1/2005 |
| TW | 408194 B | 10/2000 |
| WO | WO 93/14166 A | 7/1993 |
| WO | WO 94/11885 A | 5/1994 |
| WO | 95/12695 A1 | 5/1995 |
| WO | WO 96/17109 A1 | 6/1996 |
| WO | WO 97/34137 | 9/1997 |
| WO | WO 00/46310 A1 | 8/2000 |
| WO | WO 01/38605 A2 | 5/2001 |
| WO | WO 01/90267 A2 | 11/2001 |
| WO | WO 02/070782 | 2/2002 |
| WO | WO 02/24344 A2 | 3/2002 |
| WO | WO 02/31062 A2 | 4/2002 |
| WO | WO 02/31063 A2 | 4/2002 |
| WO | WO 02/31065 A2 | 4/2002 |
| WO | WO 02/031222 | 4/2002 |
| WO | WO 02/070781 A2 | 9/2002 |
| WO | WO 03/027203 A | 4/2003 |
| WO | WO 03/035280 A2 | 5/2003 |
| WO | WO 03/083171 A1 | 10/2003 |
| WO | WO 03/102034 A1 | 12/2003 |
| WO | WO 2004/055238 A1 | 7/2004 |
| WO | WO 04/076717 A1 | 9/2004 |
| WO | WO 04/076718 A1 | 9/2004 |
| WO | WO 2004/076568 | 9/2004 |
| WO | WO 2004/101693 A1 | 11/2004 |
| WO | WO 2006/050917 A2 | 5/2006 |

OTHER PUBLICATIONS

De Souza, et al.: "Polyaniline based acrylic blends for iron corrosion protection", *Electochem. and Solid State Letters* 4 (8) (2001) B27-B30.

DUC Le Minh "The Role of Anions in Corrosion Protection of Iron and Zinc by Polypyrrole", PhD Dissertation, Dresden, Germany (Sep. 4, 2005).

"Chapter: Pyrrole and Pyrrole Derivatives", Kirk-Othmer Encyclopedia of Chemical Technology, Wiley (2000), p. 2.

Harper, et al. "Paltics Materials and Processes: A Cibcuse Encyclopedia", Wiley (2003), pp. 95-96.

Kupila, et al. "Redox processes in thick films of polypyrrole/dodecylsulfate in the presence of alkali and tetramethylammonium chlorides", *Synthetic Metals*, 74 (1995) pp. 207-215.

(56) References Cited

OTHER PUBLICATIONS

Newman, et al., Electrochem. Systems, Wiley (2004).
Njuguna, et al. "Recent developments in polyurethane-bacsed conducting composites", *J. Material Sci.* 39 (2004) pp. 4081-4094.
Pal, Rheology of Particulate Dispersions and Composites, CRC Press (2006), p. 8.
Ruckenstein, et al.: "An emulsion pathway to electrically conductive polyaniline-polystyrene composites", *Synthetic Metals*, 53 (1993) pp. 282-292.
Szycher, Szycher's Handbook of Polyurethanes, CRC Press (1999).
Tallman, et al.: "Electroactive conducting polymers for corrosion control", *J. Solid State Electrochem.* (2002) 6 pp. 73-84.
Totten, et al. "Handbook of Aluminum" vol. 2 CRC Press (2003), p. 476.
Wiersma, et al. "Waterborne core-shell dispersions based on intrinsically conducting polymers for coating applications", *Synthetic Metals* 71 (1995), pp. 2269-2270.
Yang, et al.: "Processable conductive composites of polyaniline/poly(alkyl methacryalte) prepared via an emulsion ethod", *Synthetic Metals* 59(1993) pp. 1-12.
Yui, et al.: "Reflexive Polymers and Hydrogels: Understanding and Designing Fast Reponsive Polymeric Systems", CRC (2004).
Definition of "siloxane" from Alger, Mark, Ed., "Polymer Science Dictionary, $2^{nd}$ Ed." Copyright 1989 Chapman & Hall, 1997 Mark Alger, p. 522.

\* cited by examiner

METHOD FOR COATING METALLIC SURFACES WITH AN AQUEOUS COMPOSITION

This application is a continuation of U.S. application Ser. No. 11/667,091 filed May 4, 2007, now U.S. Pat. No. 8,182,874 B2, incorporated herein by reference, which is a § 371 of PCT/EP2005/011953 filed Nov. 9, 2005, and which is a continuation-in-part of U.S. patent application Ser. No. 10/985,652 filed Nov. 10, 2004, abandoned. This application is also a continuation-in-part of U.S. Ser. No. 12/082,841, which is a continuation of Ser. No. 10/985,652 filed Nov. 10, 2004, abandoned. This application also claims priority from German Patent Application No. 10-2005 015 573.1 filed Apr. 4, 2005, German Patent Application No. 10 2005 015 576.6 filed Apr. 4, 2005 and German Patent Application No. 10 2005 015 575.8 filed Apr. 4, 2005.

The invention relates to a process for coating metallic surfaces with an aqueous composition containing at least one silane and/or related silicon-containing compound and optionally other components, which is treated further, e.g. at temperatures above 70° C., without drying the coating.

The processes most commonly employed hitherto for the treatment of metallic surfaces, especially parts, coil or coil, portions made of at least one metallic material, or for the pretreatment of metallic surfaces prior to lacquering are frequently based on the one hand on the use of chromium (VI) compounds, optionally together with diverse additives, or on the other hand on phosphates, e.g. zinc/manganese/nickel phosphates, optionally together with diverse additives.

Because of the toxicological and ecological risks associated especially with processes using chromate or nickel, alternatives to these processes in all the areas of surface technology for metallic substrates have been sought for many years, but it has repeatedly been found that, in many applications, completely chromate-free or nickel-free processes do not satisfy 100% of the performance spectrum or do not offer the desired safety.

Attempts are therefore being made to minimize the chromate contents or nickel contents and to replace $Cr^{6+}$ with $Cr^{3+}$ as far as possible. High-quality phosphatizing processes are used especially in the automobile industry, e.g. for the pretreatment of car bodies prior to lacquering, which have maintained the quality of automobile corrosion protection at a high level. Zinc/manganese/nickel phosphatizing processes are conventionally employed for this purpose. Despite many years of research and development, attempts to phosphatize nickel-free without pronounced quality limitations have proved unsuccessful for multimetal applications such as those often involved in car bodies, where, in Europe, metallic surfaces of steel, galvanized steel and aluminium or aluminium alloys are typically pretreated in the same bath. However, since nickel contents, even if comparatively small, are now classified as being of greater toxicological concern for the foreseeable future, the question arises as to whether an equivalent corrosion protection can be achieved with other chemical processes.

The use e.g. of silanes/silanols in aqueous compositions for the production of siloxane/polysiloxane-rich anticorrosive coatings is known in principle. For the sake of simplicity, silane/silanol/siloxane/polysiloxane will, hereafter often be referred to only as silane.

These coatings have proved themselves, but some processes for coating with an aqueous composition containing predominantly silane, in addition to solvent(s), are difficult to apply. These coatings are not always formed with outstanding properties.

Moreover, adequate characterization, with the naked eye or optical aids, of the very thin, transparent silane coatings on the metallic substrate, and their defects, can be problematic. The corrosion protection and the lacquer adhesion of the siloxane- and/or polysiloxane-rich coatings formed are often high, but not always; in some cases, even with appropriate application, they are insufficiently high for particular uses. There is a need for other processes, using at least one silane, which offer a high process safety and a high quality of the coatings produced, especially in respect of corrosion resistance and lacquer adhesion.

In the formulation of silane-containing aqueous compositions, it has also proved beneficial to add a small or large amount of at least one component selected from the group comprising organic monomers, oligomers and polymers. The type and amount of silane added to such compositions is in some cases of decisive importance for the outcome. Conventionally, however, the amounts of silane added are comparatively small—usually only up to 5 wt % of the total solids content—and they then function as a coupling agent, where the adhesion-promoting action should prevail especially between metallic substrate and lacquer and optionally between pigment and organic lacquer constituents, but a slight crosslinking action can also occur in some cases as a secondary effect. Chiefly, very small amounts of silane are added to thermosetting resin systems.

The other two patent applications on a similar subject matter submitted to the same patent office on the same date are expressly included here, especially in respect of the aqueous compositions, the additions to the aqueous compositions, the steps before, during and after coating, the bath behaviour, the layer formation, the layer properties and the effects determined, particularly in the Examples and Comparative Examples. Likewise, the patent applications that give rise to a right of priority are also expressly included in the subsequent patent applications.

It is currently known that, when using silane-containing solutions for coating metallic surfaces, the solutions containing essentially or predominantly silane and derivatives thereof are water-sensitive if the coatings have not been dried more substantially, so rinsing of the freshly applied and not yet thoroughly dried coatings with water normally leads to impairment of the coatings, e.g. due to peeling, because they are not sufficiently rinse-resistant. Evidently the very thin oxide/hydroxide layers of the "natural" oxide skins of metallic surfaces are not sufficient to keep freshly applied silane adequately adhesive prior to thorough drying. Only if the coatings are dried e.g. for 5 minutes at 80° C. PMT (peak metal temperature), for 25 minutes at 70° C. PMT or more substantially are these coatings normally insensitive to water, because the condensation of the silanes/silanols/siloxanes/polysiloxanes is more advanced. The extent of drying, which is associated with condensation of the silanes/silanols/siloxanes/polysiloxanes and makes the siloxane/polysiloxane-containing coating rinse-resistant, varies according to the existence of phases, the coating and the type of rinsing.

Existing phosphatizing units, especially in the automobile industry for the cleaning and pretreatment of car bodies prior to lacquering, do not need a drying unit. Even without a drying unit, however, such a channel-like unit is often well over one hundred meters long. In many cases, at the end where the newly phosphatized car bodies come out of the channel, these units are joined directly to a unit for coating with a cathodic dip lacquer (CDL), so normally there is no space available for the additional construction of a drying unit.

The object was therefore to propose aqueous compositions whose coatings have an environmentally friendly chemical composition and assure a high corrosion resistance, and which are also suitable in multimetal applications in which e.g. steel and zinc-rich metallic surfaces, and optionally also aluminium-rich metallic surfaces, are treated or pretreated in the same bath. The object was also to propose a pretreatment process, especially for car bodies in automobile mass production, which can be carried out with silane-containing solutions in the simplest and safest possible manner. The object was also to propose a process using silane-containing aqueous compositions which in principle can be carried out in existing plants in the automobile industry and is particularly suitable for coating car bodies in automobile construction. The quality of the coatings on car body surfaces achieved by this process should come as close as possible to the properties of the high-quality anticorrosive coatings produced by zinc/manganese/nickel phosphatizing processes, so as not to compromise the quality standard.

It has now been found that the addition of at least one complex fluoride helps to minimize or avoid impairments of the bond between the silane and the metallic surface so that rinsing can only have a very slight impairing effect, if any. It has now also been found that a combination of at least two complex fluorides, especially fluorotitanic acid and fluorozirconic acid, affords an exceptional increase in quality of the coating.

It has now been found not only that it is possible to rinse freshly applied silane-based coatings that have not yet dried thoroughly and hence not yet condensed more substantially, but also that this process sequence is even advantageous, because the coatings produced and rinsed in this way even have better corrosion protection and better lacquer adhesion, to some extent independently of the chemical composition of the aqueous bath. This contradicts earlier experiences where the rinsing of a freshly applied silane-based coating that has not yet dried more substantially easily and frequently leads to an impairment of the quality of the layer, or even to the removal of part or, occasionally, all of the coating.

It has now also been found that it is possible and advantageous to apply a lacquer, a lacquer-like coating, a primer or an adhesive to freshly applied silane-based coatings that have not yet dried thoroughly and hence not yet condensed more substantially, which may also have been rinsed in this state. The application of such compositions to silane-based wet films is advantageous because the coatings produced and rinsed in this way even have better corrosion protection and better lacquer adhesion, to some extent independently of the chemical composition of the aqueous bath.

The object is achieved by a process for coating metallic surfaces with a composition containing silane/silanol/siloxane/polysiloxane, the composition containing the following in addition to water and optionally in addition to at least one organic solvent and/or at least one substance that influences the pH:
at least one compound a) selected from silanes, silanols, siloxanes and polysiloxanes, at least one of these compounds still being capable of condensation, and optionally also
at least one compound b) containing titanium, hafnium, zirconium, aluminium and/or boron,
at least one type of cation c) selected from cations of metals of subgroups 1 to 3 and 5 to 8, including lanthanides, and of main group 2 of the periodic table of the elements, and/or at least one corresponding compound, and/or
at least one organic compound d) selected from monomers, oligomers, polymers, copolymers and block copolymers,
wherein the coating freshly applied with this composition is rinsed with a fluid and is not dried thoroughly before this rinsing step so that the at least one compound a) capable of condensation does not condense substantially before the coating is rinsed.

The object is also achieved by a process for coating metallic surfaces with a composition containing silane/silanol/siloxane/polysiloxane, the composition containing the following in addition to water and optionally in addition to at least one organic solvent and/or at least one substance that influences the pH:
at least one compound a) selected from silanes, silanols, siloxanes and polysiloxanes, at least one of these compounds still being capable of condensation, and optionally also
at least one compound b) containing titanium, hafnium, zirconium, aluminium and/or boron,
at least one type of cation c) selected from cations of metals of subgroups 1 to 3 and 5 to 8, including lanthanides, and of main group 2 of the periodic table of the elements, and/or at least one corresponding compound, and/or
at least one organic compound d) selected from monomers, oligomers, polymers, copolymers and block copolymers,
wherein the coating freshly applied with this composition is not dried thoroughly before the application of a subsequent coating so that the at least one compound a) capable of condensation does not condense substantially before the application of the subsequent coating.

The content of the patent application that gives rise to a right of priority to the present patent application, DE 102005015576.6, the content of the other, related patent applications that give rise to a right of priority, DE 102005015573.1, DE 102005015575.8 and U.S. Ser. No. 10/985,652, and the content of the parallel PCT applications issuing from the three last-mentioned patent applications that give rise to a right of priority, is to be expressly included in the present patent application, especially in respect of the different compositions, different compounds added, different process steps, different coatings produced, Examples, Comparative Examples and effects, properties and laboratory results mentioned therein.

The subsequent coating can be a second conversion coating, a coating resulting from the application of an afterrinsing solution, or a coating based on a lacquer, a lacquer-like composition, a primer or an adhesive.

The second conversion coating or the coating resulting from the application of an afterrinsing solution is preferably an aqueous composition based on at least one silane/silanol/siloxane/polysiloxane, at least, one compound containing titanium, hafnium, zirconium, aluminium and/or boron (e.g. at least one complex fluoride), at least one organic compound selected from monomers, oligomers, polymers, copolymers and block copolymers, and/or at least one compound containing phosphorus and oxygen. In many embodiments the concentration of the aqueous composition for the second conversion coating, or of the afterrinsing solution, is overall lower than that of a comparable aqueous composition for the first conversion coating, i.e. the silane pretreatment layer according to the invention.

It is particularly advantageous if the freshly applied coating is first rinsed with a fluid before a subsequent coating is applied. In this case the wet film of the silane pretreatment according to the invention can be rinsed with water or with an aqueous composition optionally containing surfactant, without the wet film being dried more substantially beforehand. A subsequent coating can then be applied to this wet film while it is still in an insubstantially dried state, especially by the application of a lacquer, a lacquer-like composition, a primer or an adhesive. The rinsing of the wet film after the silane pretreatment is preferably carried out immediately after coating with the silane-containing aqueous composition, especially within one or two minutes of coating with the silane pretreatment according to the invention, particularly preferably within 30 seconds or even within 10 seconds of this coating step. The lacquer, lacquer-like composition, primer or adhesive is preferably applied immediately after rinsing, especially within two or three minutes of the rinsing of the silane-containing coating, particularly preferably within 60 seconds or even within 20 seconds. The lacquer in this case can be especially an electro-dip lacquer or a wet lacquer containing water.

It is assumed that the at least one silane still capable of condensation is even more chemically reactive, and in particular can react more intensely with a subsequently applied primer, lacquer, lacquer-like or adhesive layer, than a silane that has already been dried thoroughly and has condensed substantially under the influence of heat.

The word "silane" is used here for silanes, silanols, siloxanes, polysiloxanes and their reaction products or derivatives, which often are also "silane" mixtures. In terms of the present patent application, the word "condensation" denotes all forms of crosslinking, further crosslinking and further chemical reactions of the silanes/silanols/siloxanes/polysiloxanes. In terms of the present patent application, the word "coating" refers to the coating formed with the aqueous composition, including the wet film, the dried-on film, the thoroughly dried film, the film dried at elevated temperature and the film optionally crosslinked further by heating and/or irradiation.

The aqueous composition is an aqueous solution, an aqueous dispersion and/or an emulsion. The pH of the aqueous composition is preferably greater than 1.5 and less than 9, particularly preferably in the range from 2 to 7, very particularly preferably in the range from 2.5 to 6.5 and especially in the range from 3 to 6. At a pH of 2.5, for example, a markedly reduced deposition of titanium or zirconium compounds from the complex fluoride can occur, causing a slight degradation of the layer properties. At a pH of about 7, the bath containing the complex fluoride can become unstable and precipitations can occur.

Particularly preferably, at least one silane and/or at least one corresponding compound having at least one amino group, urea group and/or ureido group (imino group) is added to the aqueous composition because the coatings produced therewith often exhibit a greater lacquer adhesion and/or a higher affinity for the subsequent lacquer layer. In particular, when using at least one silane and/or at least one corresponding compound having at least one such group, it should be pointed out that condensation may proceed very rapidly at pH values below 2. The proportion of aminosilanes, ureidosilanes and/or silanes having at least one urea group, and/or of corresponding silanols, siloxanes and polysiloxanes, relative to the sum of all types of compounds selected from silanes, silanols, siloxanes and polysiloxanes, can preferably be high, particularly preferably above 20, above 30 or above 40 wt. %, calculated as the corresponding silanols, very particularly preferably above 50, above 60, above 70 or above 80 wt. % and possibly even up to 90, up to 95 or up to 100 wt. %.

Preferably, the aqueous composition has a content of silane/silanol/siloxane/polysiloxane a) ranging from 0.005 to 80 g/l, calculated on the basis of the corresponding silanols. This content is particularly preferably in the range from 0.01 to 30 g/l, very particularly preferably in the range from 0.02 to 12 g/l, to 8 g/l or to 5 g/l and especially in the range from 0.05 to 3 g/l or in the range from 0.08 to 2 g/l or to 1 g/l. These ranges of contents refer particularly to bath compositions.

However, if a concentrate is used to prepare a corresponding bath composition, especially by dilution with water and optionally by the addition of at least one other substance, it is advisable, for example, to keep a concentrate A containing silane/silanol/siloxane/polysiloxane a) separate from a concentrate B containing all or almost all of the remaining constituents, and only to bring these components together in the bath. This optionally also makes it possible for at least one silane, silanol, siloxane and/or polysiloxane to be partially or completely in the solid state, to be added in the solid state and/or to be added as a dispersion or solution. However, the main emphases of the contents in the concentration ranges of the bath can vary with the application.

Particularly preferably, the composition, contains at least one silane, silanol, siloxane and/or polysiloxane a) having in each case at least one group selected from acrylate groups, alkylaminoalkyl groups, alkylamino groups, amino groups, aminoalkyl groups, succinic anhydride groups, carboxyl groups, epoxy groups, glycidoxy groups, hydroxyl groups, ureido groups (imino groups), isocyanato groups, methacrylate groups and/or urea groups.

The silanes, silanols, siloxanes and/or polysiloxanes in the aqueous composition, or at least their compounds added to the aqueous composition, or at least some of these, are preferably water-soluble. In terms of the present patent application, the silanes are regarded as water-soluble if together they have a solubility in water of at least 0.05 g/l, preferably of at least 0.1 g/l and particularly preferably of at least 0.2 g/l or at least 0.3 g/l at room temperature in the composition containing silane/silanol/siloxane/polysiloxane. This does not mean that each individual silane must have this minimum solubility, but that these minimum values are achieved on average.

The aqueous composition preferably contains at least one silane/silanol/siloxane/polysiloxane selected from fluorine-free silanes and the corresponding silanols/siloxanes/polysiloxanes, consisting respectively of at least one acyloxysilane, alkoxysilane, silane having at least one amino group, such as an aminoalkylsilane, silane having at least one succinic acid group and/or succinic anhydride group, bis(silyl)silane, silane having at least one epoxy group, such as a glycidoxy-silane, (meth)acrylatosilane, poly(silyl)silane, ureidosilane or vinylsilane, and/or at least one silanol and/or at least one siloxane or polysiloxane whose chemical composition corresponds to that of the silanes mentioned above. It contains at least one silane and/or (in each case) at least one monomeric, dimeric, oligomeric and/or polymeric silanol and/or (in each case) at least one monomeric, dimeric, oligomeric and/or polymeric siloxane, oligomers being understood hereafter to include dimers and trimers. Particularly preferably, the at least one silane or the corresponding silanol/siloxane/polysiloxane has in each case at least one amino group, urea group and/or ureido group.

In particular, the composition contains at least one silane and/or at least one corresponding silanol/siloxane/polysiloxane selected from the following group or based thereon:
- (3,4-epoxyalkyl)trialkoxysilane,
- (3,4-epoxycycloalkyl)alkyltrialkoxysilane,
- 3-acryloxyalkyltrialkoxysilane,
- 3-glycidoxyakkyltrialkoxysilane,
- 3-methacryloxyalkyltrialkoxysilane,
- 3-(trialkoxysilyl)alkylsuccinosilane,
- 4-aminodialkylalkyltrialkoxysilane,
- 4-aminodialkylalkylalkyldialkoxysilane,
- aminoalkylaminoalkyltrialkoxysilane,
- aminoalkylaminoalkylalkyldialkoxysilane,
- aminoalkyltrialkoxysilane,
- bis(trialkoxysilylalkyl)amine,
- bis(trialkoxysilyl)ethane,
- gamma-acryloxyalkyltrialkoxysilane,
- gamma-aminoalkyltrialkoxysilane,
- gamma-methacryloxyalkyltrialkoxysilane,
- (gamma-trialkoxysilylalkyl)dialkylenetriamine,
- gamma-ureidoalkyltrialkoxysilane,
- N-2-aminoalkyl-3-aminopropyltrialkoxysilane,
- N-(3-trialkoxysilylalkyl)alkylenediamine,
- N-alkylaminoisoalkyltrialkoxysilane,
- N-(aminoalkyl)aminoalkylalkyldialkoxysilane,
- N-beta-(aminoalkyl)-gamma-aminoalkyltrialkoxysilane,
- N-(gamma-trialkoxysilylalkyl)dialkylenetriamine,
- N-phenylaminoalkyltrialkoxysilane,
- poly(aminoalkyl)alkyldialkoxysilane,
- tris(3-trialkoxysilyl)alkylisocyanurate,
- ureidoalkyltrialkoxysilane and
- vinylacetoxysilane.

Particularly preferably, the composition contains at least one silane and/or at least one corresponding silanol/siloxane/polysiloxane selected from the following group or based thereon:
- (3,4-epoxybutyl)triethoxysilane,
- (3,4-epoxybutyl)trimethoxysilane,
- (3,4-epoxycyclohexyl)propyltriethoxysilane,
- (3,4-epoxycyclohexyl)propyltrimethoxysilane,
- 3-acryloxypropyltriethoxysilane,
- 3-acryloxypropyltrimethoxysilane,
- 3-aminopropylsilanetriol,
- 3-glycidoxypropyltriethoxysilane,
- 3-glycidoxypropyltrimethoxysilane,
- 3-methacryloxypropyltriethoxysilane,
- 3-methacryloxypropyltrimethoxysilane,
- 3-(triethoxysilyl)propylsuccinosilane,
- aminoethylaminopropylmethyldiethoxysilane,
- aminoethylaminopropylmethyldimethoxysilane,
- aminopropyltrialkoxysilane,
- beta-(3,4-epoxycyclohexyl)ethyltriethoxysilane,
- beta-(3,4-epoxycyclohexyl)ethyltrimethoxysilane,
- beta-(3,4-epoxycyclohexyl)methyltriethoxysilane,
- beta-(3,4-epoxycyclohexyl)methyltrimethoxysilane,
- bis-1,2-(triethoxysilyl)ethane,
- bis-1,2-(trimethoxysilyl)ethane,
- bis(triethoxysilylpropyl)amine,
- bis(trimethoxysilylpropyl)amine,
- gamma-(3,4-epoxycyclohexyl)propyltriethoxysilane,
- gamma-(3,4-epoxycyclohexyl)propyltrimethoxysilane,
- gamma-acryloxypropyltriethoxysilane,
- gamma-acryloxypropyltrimethoxysilane,
- gamma-aminopropyltriethoxysilane,
- gamma-aminopropyltrimethoxysilane,
- gamma-methacryloxypropyltriethoxysilane,
- gamma-methacryloxypropyltrimethoxysilane,
- gamma-ureidopropyltrialkoxysilane,
- N-2-aminoethyl-3-aminopropyltriethoxysilane,
- N-2-aminoethyl-3-aminopropyltrimethoxysilane,
- N-2-aminomethyl-3-aminopropyltriethoxysilane,
- N-2-aminomethyl-3-aminopropyltrimethoxysilane,
- N-(3-(trimethoxysilyl)propyl)ethylenediamine,
- N-beta-(aminoethyl)-gamma-aminopropyltriethoxysilane,
- N-beta-(aminoethyl)-gamma-aminopropyltrimethoxysilane,
- N-(gamma-triethoxysilylpropyl)diethylenetriamine,
- N-(gamma-trimethoxysilylpropyl)diethylenetriamine,
- N-(gamma-triethoxysilylpropyl)dimethylenetriamine,
- N-(gamma-trimethoxysilylpropyl)dimethylenetriamine,
- poly(aminoalkyl)ethyldialkoxysilane,
- poly(aminoalkyl)methyldialkoxysilane,
- tris(3-(triethoxysilyl)propyl)isocyanurate,
- tris(3-(trimethoxysilyl)propyl)isocyanurate,
- ureidopropyltrialkoxysilane and
- vinyltriacetoxysilane.

Optionally, in specific embodiments, the aqueous composition contains at least one silane/silanol/siloxane/polysiloxane having a fluorine-containing group. By choosing the silane compound(s) it is also possible to adjust the hydrophilicity/hydrophobicity according to the desired objective.

Preferably, in some embodiments of the aqueous composition, at least one at least partially hydrolysed, at least partially condensed silane/silanol/siloxane/polysiloxane is added. In particular, when mixing the aqueous composition, it is optionally possible to add at least one already prehydrolysed, precondensed silane/silanol/siloxane/polysiloxane. Such an addition is particularly preferred.

In some embodiments, at least one at least extensively and/or completely hydrolysed and/or at least extensively and/or completely condensed silane/silanol/siloxane/polysiloxane can be added to the aqueous composition. In many embodiments, a non-hydrolysed silane bonds to the metallic surface less well than an at least partially hydrolysed silane/silanol. In many embodiments, an extensively hydrolysed and uncondensed or only slightly condensed silane/silanol/siloxane bonds to the metallic surface markedly better than an at least partially hydrolysed and extensively condensed silane/silanol/siloxane/polysiloxane. In many embodiments, a completely hydrolysed and extensively condensed silanol/siloxane/polysiloxane exhibits only a slight tendency to become chemically bonded to the metallic surface.

In some embodiments, at least one siloxane and/or polysiloxane containing little or no silanes/silanols—e.g. less than 20 or less than 40 wt. % of the sum of silane/silanol/siloxane/polysiloxane—can be added to the aqueous composition in addition and/or as an alternative to silane(s)/silanol(s). The siloxane or polysiloxane is preferably short-chain and is preferably applied by means of a rollcoater treatment. This then optionally affects the coating by strengthening the hydrophobicity and increasing the blank corrosion protection.

Preferably, the aqueous composition contains at least two or even at least three titanium, hafnium, zirconium, aluminium and boron compounds, it being possible for these compounds to differ in their cations and/or anions. The aqueous composition, especially the bath composition, preferably contains at least one complex fluoride b) and particularly preferably at least two complex fluorides selected from complex fluorides of titanium, hafnium, zirconium, aluminium and boron. Preferably, their difference lies not only in the type of complex. The aqueous composition, especially the bath composition, preferably has a content of compounds b), selected from titanium, hafnium, zirconium, aluminium and boron compounds, ranging from 0.01 to 50 g/l, calculated as the sum of the corresponding metals. This content ranges particularly preferably from 0.05 to 30 g/l, very particularly preferably from 0.08 to 15 g/l and especially from 0.1 to 5 g/l.

Preferably, the composition contains at least one complex fluoride, the content of complex fluoride (a) ranging especially from 0.01 to 100 g/l, calculated as the sum of the corresponding metal complex fluorides as $MeF_6$. This content ranges preferably from 0.03 to 70 g/l, particularly preferably from 0.06 to 40 g/l and very particularly preferably from 1 to 10 g/l. The complex fluoride can be present especially as $MeF_4$ and/or $MeF_6$, but also in other states or intermediate states. Advantageously, at least one titanium complex fluoride and at least one zirconium complex fluoride are simultaneously present in many embodiments. It can be advantageous in many cases here to have at least one $MeF_4$ complex and at least one $MeF_6$ complex present in the composition simultaneously, especially a $TiF_6$ complex and a $ZrF_4$ complex. It can be advantageous here to adjust these proportions of complex fluorides in the concentrate and transfer them to the bath in this way.

Surprisingly, the individual complex fluorides do not adversely affect one another when combined, but exhibit an unexpected positive reinforcing effect. These additions based on complex fluoride obviously act in a similar or identical manner. Surprisingly, if a combination of complex fluorides based on titanium and zirconium was used rather than a complex fluoride based only on titanium or only on zirconium, the results obtained were always noticeably better than in the case of only one of these additions. A complex fluoride based on titanium or zirconium probably deposits on the surface as oxide and/or hydroxide.

It has now been established, surprisingly, that a good multimetal treatment with a single aqueous composition is only possible if a complex fluoride has been used, and that a very good multimetal treatment with a single aqueous composition is only possible if at least two different complex fluorides are used, e.g. those based on titanium and zirconium. In a very wide variety of experiments, the complex fluorides used individually never gave results equivalent to those for the combination of these two complex fluorides, independently of what other additions were made.

As an alternative or in addition to at least one complex fluoride, it is also possible to add another type of titanium, hafnium, zirconium, aluminium and/or boron compound, for example at least one hydroxycarbonate and/or at least one other water-soluble or sparingly water-soluble compound, e.g. at least one nitrate and/or at least one carboxylate.

It has now been shown, however, that an addition of silicon hexafluoride as the only complex fluoride added to an aqueous composition has a different and sometimes markedly poorer effect than the additions of other complex fluorides.

Preferably, only types of cation, or corresponding compounds, from the group comprising magnesium, calcium, yttrium, lanthanum, cerium, vanadium, niobium, tantalum, molybdenum, tungsten, manganese, iron, cobalt, nickel, copper, silver and zinc, and particularly preferably from the group comprising magnesium, calcium, yttrium, lanthanum, cerium, vanadium, molybdenum, tungsten, manganese, iron, cobalt, copper and zinc, are selected as cations and/or corresponding compounds C), trace contents being excepted.

On the other hand, it has been shown, surprisingly, that iron and zinc cations, and therefore also the presence in the bath of corresponding compounds which can make an increased contribution, in the particular case of acidic compositions, to dissolving such ions out of the metallic surface, do not have an adverse effect, over wide ranges of contents, on the bath behaviour, the layer formation or the layer properties, Preferably, the aqueous composition, especially the bath composition, has a content of cations and/or corresponding compounds c) ranging from 0.01 to 20 g/l, calculated as the sum of the metals. This content ranges particularly preferably from 0.03 to 15 g/l, very particularly preferably from 0.06 to 10 g/l and especially from 0.1 to 6 g/l.

The composition preferably contains at least one type of cation selected from cations of cerium, chromium, iron, calcium, cobalt, copper, magnesium, manganese, molybdenum, nickel, niobium, tantalum, yttrium, zinc, tin and other lanthanides, and/or at least one corresponding compound. Preferably, not all the cations present in the aqueous composition have been not only dissolved out of the metallic surface by the aqueous composition, but also at least partially or even extensively added to the aqueous composition. A freshly prepared bath can therefore be free of certain cations or compounds which are only freed or formed from reactions with metallic materials or from reactions in the bath.

Surprisingly, the addition of manganese ions or at least one manganese compound has been shown to be particularly advantageous. Although apparently no manganese compound or almost no manganese compound is deposited on the metallic surface, this addition clearly promotes the deposition of silane/silanol/siloxane/polysiloxane, thereby significantly improving the properties of the coating. Unexpectedly, an addition of magnesium ions or at least one magnesium compound has also been shown to be advantageous, since this addition promotes the deposition of titanium and/or zirconium compounds, probably as oxide and/or hydroxide, on the metallic surface and thus markedly improves the properties of the coating. A combined addition of magnesium and manganese improves the coatings still further in some cases. By contrast, an addition of only 0.02 g/l of copper ions has not yet been shown to have a significant influence. If the calcium ion content is increased, care should be taken to ensure that a complex fluoride is not destabilized by the formation of calcium fluoride.

Preferably, the composition has a content of at least one type of cation and/or corresponding compounds, selected from alkaline earth metal ions, ranging from 0.01 to 50 g/l, calculated as corresponding compounds, particularly preferably from 0.03 to 35 g/l, very particularly preferably from 0.06 to 20 g/l and especially from 0.1 to 8 g/l. The alkaline earth metal ions or corresponding compounds can help to reinforce the deposition of compounds based on titanium and/or zirconium, which is often advantageous especially for increasing the corrosion resistance.

Preferably, the composition has a content of at least one type of cation, selected from cations of iron, cobalt, magnesium, manganese, nickel, yttrium, zinc and lanthanides, and/or of at least one corresponding compound c), ranging especially from 0.01 to 20 g/l, calculated as the sum of the metals. This content ranges particularly preferably from 0.03 to 15 g/l, very particularly preferably from 0.06 to 10 g/l and especially from 0.1 to 6 g/l.

Preferably, the composition contains at least one organic compound d) selected from monomers, oligomers, polymers, copolymers and block copolymers, especially at least one compound based on acrylic, epoxide and/or urethane. At least one organic compound having at least one silyl group can also be used here, in addition or as an alternative. It is preferred in some embodiments to use organic compounds having a content or a higher content of OH groups, amine groups, carboxylate groups, isocyanate groups and/or isocyanurate groups.

Preferably, the composition has a content of at least one organic compound d), selected from monomers, oligomers, polymers, copolymers and block copolymers, ranging from 0.01 to 200 g/l, calculated as added solids. The content ranges particularly preferably from 0.03 to 120 g/l, very particularly preferably from 0.06 to 60 g/l and especially from 0.1 to 20 g/l. In some embodiments, such organic compounds can help to homogenize the formation of the coating. These compounds can contribute to the formation of a more compact, denser, more chemically resistant and/or more water-resistant coating, compared with coatings based on silane/silanol/siloxane/polysiloxane etc. without these compounds. The hydrophilicity/hydrophobicity can also be adjusted according to the desired objective by the choice of organic compound(s). However, a strongly hydrophobic coating is problematic in some applications because of the required bonding of especially water-based lacquers, although a stronger hydrophobicity can be established in the case of powder coatings in particular. When using an addition of at least one organic compound, a combination with compounds having a certain functionality can prove particularly advantageous, examples being compounds based on amines/diamines/polyamines/urea/imines/diimines/polyimines or derivatives thereof, compounds based in particular on capped isocyanate/isocyanurate/melamine compounds, and compounds with carboxyl and/or hydroxyl groups, e.g. carboxylates, longer-chain sugar-like compounds, e.g. (synthetic) starch, cellulose, saccharides, long-chain alcohols and/or derivatives thereof. The long-chain alcohols added are especially those having 4 to 20 C atoms, such as a butanediol, a butyl glycol, a butyl diglycol, an ethylene glycol ether such as ethylene glycol monobutyl ether, ethylene glycol monoethyl ether, ethylene glycol monomethyl ether, ethyl glycol propyl ether, ethylene glycol hexyl ether, diethylene glycol methyl ether, diethylene glycol ethyl ether, diethylene glycol butyl ether or diethylene glycol hexyl ether, or a propylene glycol ether such as propylene glycol monomethyl ether, dipropylene glycol monomethyl ether, tripropylene glycol monomethyl ether, propylene glycol monobutyl ether, dipropylene glycol monobutyl ether, tripropylene glycol monobutyl ether, propylene glycol monopropyl ether, dipropylene glycol monopropyl ether, tripropylene glycol monopropyl ether or propylene glycol phenyl ether, trimethylpentanediol diisobutyrate, a polytetrahydrofuran, a polyetherpolyol and/or a polyesterpolyol.

The weight ratio of compounds based on silane/silanol/siloxane/polysiloxane, calculated on the basis of the corresponding silanols, to compounds based on organic polymers, calculated as added solids, in the composition, ranges preferably from 1:0.05 to 1:30, particularly preferably from 1:0.1 to 1:2 and very particularly preferably from 1:0.2 to 1:20. In many embodiments this ratio ranges from 1:0.25 to 1:12, from 1:0.3 to 1:8 or from 1:0.35 to 1:5.

It has now been found, surprisingly, that an addition of organic polymer and/or copolymer, in particular, markedly improves the corrosion resistance, especially on iron and steel, and is of particular advantage for a higher process safety and constantly good coating properties.

The composition optionally has a content of silicon-free compounds having at least one amino, urea and/or ureido group, especially amine/diamine/polyamine/urea/imine/diimine/polyimine compounds and derivatives thereof, ranging preferably from 0.01 to 30 g/l, calculated as the sum of the corresponding compounds. The content ranges particularly preferably from 0.03 to 22 g/l, very particularly preferably from 0.06 to 15 g/l and especially from 0.1 to 10 g/l. It is preferable to add at least one compound such as aminoguanidine, monoethanolamine, triethanolamine and/or a branched urea derivative with an alkyl radical. An addition of aminoguanidine, for example, markedly improves the properties of the coatings according to the invention.

Optionally, the composition has a content of nitrite anions and compounds with a nitro group preferably ranging from 0.01 to 10 g/l, calculated as the sum of the corresponding compounds. The content ranges particularly preferably from 0.02 to 7.5 g/l, very particularly preferably from 0.03 to 5 g/l and especially from 0.05 to 1 g/l. This substance is preferably added as nitrous acid, $HNO_2$, an alkali-metal nitrite, ammonium nitrite, nitroguanidine and/or paranitrotoluenesulfonic acid, especially as sodium nitrite and/or nitroguanidine.

It has now been found, surprisingly, that an addition of nitroguanidine, in particular, to the aqueous composition makes the appearance of the coatings according to the invention very homogeneous and perceptibly increases the coating quality. This has a very positive effect especially on "sensitive" metallic surfaces such as sand-blasted iron or steel surfaces. An addition of nitroguanidine noticeably improves the properties of the coatings according to the invention.

It has now been found, surprisingly, that an addition of nitrite can markedly reduce the rusting tendency particularly of iron and steel surfaces.

Optionally, the composition has a content of compounds based on peroxide, e.g. hydrogen peroxide and/or at least one organic peroxide, preferably ranging from 0.005 to 5 g/l, calculated as $H_2O_2$. The content ranges particularly preferably from 0.006 to 3 g/l, very particularly preferably from 0.008 to 2 g/l and especially from 0.01 to 1 g/l. If titanium is present, the bath often contains a titanium per oxo complex that colours the solution or dispersion orange. Typically, however, this colouration is not in the coating because this complex is apparently not incorporated as such into the coating. The titanium or peroxide content can therefore be estimated via the colour of the bath. The substance is preferably added as hydrogen peroxide.

It has now been found, unexpectedly, that an addition of hydrogen peroxide to the aqueous composition according to the invention improves the optical quality of the coated substrates.

Optionally, the composition has a content of phosphorus-containing compounds preferably ranging from 0.01 to 20 g/l, calculated as the sum of the phosphorus-containing compounds. These compounds preferably contain phosphorus and oxygen, especially as oxyanions and corresponding compounds. The content ranges particularly preferably from 0.05 to 18 g/l, very particularly preferably from 0.1 to 15 g/l and especially from 0.2 to 12 g/l. Preferably, at least one orthophosphate, at least one oligomeric and/or polymeric phosphate and/or at least one phosphonate are added in each case as substance $d_4$). The at least one orthophosphate and/or salts thereof and/or esters thereof can be e.g. at least one alkali-metal phosphate, at least one orthophosphate containing iron, manganese and/or zinc, and/or at least one of their salts and/or esters. Instead or in addition, it is also possible to add in each case at least one metaphosphate, polyphosphate, pyrophosphate, triphosphate and/or salts thereof and/or esters thereof. As phosphonate it is possible to add e.g. at least one phosphonic acid, such as at least one alkyldiphosphonic acid, and/or salts thereof and/or esters thereof. The phosphorus containing compounds of this group of substances are not surfactants.

It has now been found, surprisingly, that an addition of orthophosphate to the aqueous composition according to the invention markedly improves the quality of the coatings, especially on electrogalvanized substrates.

It has now also been found, surprisingly, that an addition of phosohonate to the aqueous composition according to the invention noticeably improves the corrosion resistance of aluminium-rich surfaces, especially as regards values in the CASS test.

Optionally, the aqueous composition contains at least one type of anion selected from carboxylates, e.g. acetate, butyrate, citrate, formate, fumarate, glycolate, hydroxyacetate, lactate, laurate, maleate, malonate, oxalate, propionate, stearate and tartrate, and/or at least one corresponding undissociated and/or only partially dissociated compound.

Optionally, the composition has a content of carboxylate anions and/or carboxylate compounds ranging from 0.01 to 30 g/l, calculated as the sum of the corresponding compounds. The content ranges particularly preferably from 0.05 to 15 g/l, very particularly preferably from 0.1 to 8 g/l and especially from 0.3 to 3 g/l. Particularly preferably, in each case at least one citrate, lactate, oxalate and/or tartrate can be added as carboxylate. The addition of at least one carboxylate can help to complex a cation and keep it in solution more easily, thereby making it possible to increase the stability and controllability of the bath. Surprisingly, it has been found that the bonding of a silane to the metallic surface can in some cases be facilitated and improved by a carboxylate content.

Preferably, the composition also contains nitrate. Preferably, it contains a nitrate content in the range from 0.01 to 20 g/l, calculated as the sum of the corresponding compounds. The content ranges particularly preferably from 0.03 to 12 g/l, very particularly preferably from 0.06 to 8 g/l and especially from 0.1 to 5 g/l. Nitrate can help to homogenize the formation of the coating, especially on steel. Nitrite may be converted to nitrate, usually only partially. Nitrate can be added especially as an alkali-metal nitrate, ammonium nitrate, a heavy metal nitrate, nitric acid and/or a corresponding organic compound. The nitrate can markedly reduce the rusting tendency, especially on steel, and iron surfaces. The nitrate can optionally contribute to the formation of a defect-free coating and/or an exceptionally even coating that may be free of optically recognizable marks.

The composition preferably contains at least one type of cation selected from alkali-metal ions, ammonium ions and corresponding compounds, especially potassium and/or sodium ions, or at least one corresponding compound.

Optionally, the composition has a free fluoride content ranging from 0.001 to 3 g/l, calculated as F. The content ranges preferably from 0.01 to 1 g/l, particularly preferably from 0.02 to 0.5 g/l and very particularly preferably up to 0.1 g/l. It has been determined that it is advantageous in many embodiments to have a low free fluoride content in the bath because the bath can then be stabilized in many embodiments. An excessively high free fluoride content can sometimes adversely affect the deposition rate of cations. In addition, undissociated and/or uncomplexed fluoride can also occur in many cases, especially in the range from 0.001 to 0.3 g/l. Such an addition is preferably made in the form of hydrofluoric acid and/or its salts.

Preferably, the composition has a content of at least one fluoride-containing compound and/or fluoride anions, calculated as F and without including complex fluorides, especially at least one fluoride from alkali-metal fluoride (s), ammonium fluoride and/or hydrofluoric acid, ranging particularly preferably from 0.001 to 12 g/l, very particularly preferably from 0.005 to 8 g/l and especially from 0.01 to 3 g/l. The fluoride ions or corresponding compounds can help to control the deposition of the metal ions on the metallic surface so that, for example, the deposition of the at least one zirconium compound can be increased or decreased as required. The weight ratio of the sum of the complex fluorides, calculated as the sum of the associated metals, to the sum of the free fluorides, calculated as F, is preferably greater than 1:1, particularly preferably greater than 3:1, very particularly preferably greater than 5:1 and especially greater than 10:1.

In the process according to the invention, the aqueous composition can contain at least one compound selected from alkoxides, carbonates, chelates, surfactants and additives, e.g. biocides and/or defoamers.

Acetic acid, for example, can be added as a catalyst for the hydrolysis of a silane. The pH of the bath can be raised e.g. with ammonia/ammonium hydroxide, an alkali-metal hydroxide and/or a compound based on amine, such as monoethanolamine, while the pH of the bath can preferably be lowered with acetic acid, hydroxyacetic acid and/or nitric acid. Such additions belong to the substances that influence the pH.

The aforementioned contents or additions normally have a beneficial effect in the aqueous compositions according to the invention in that they tend to improve further the good properties of the aqueous base composition according to the invention consisting of components a) and b) and solvent(s). These additions normally act in the same way if only one titanium compound or only one zirconium compound, or a combination thereof, is used. However, it has been shown, surprisingly, that the combination of at least one titanium compound and at least one zirconium compound, especially as complex fluorides, significantly improves the properties particularly of the coatings produced therewith. Surprisingly, the different additives thus function as in a modular system and make a substantial contribution to optimization of the particular coating. In the specific case where a so-called multimetal mix is used, as often occurs in the pretreatment of car bodies and in the treatment or pretreatment of different hardware or assembly parts, the aqueous composition according to the invention has proved very suitable since the composition containing the various additives can be specifically optimized to the particular multimetal mix and its peculiarities and requirements.

With the process according to the invention, a mix of different metallic materials, e.g. as in the case of car bodies or different hardware, can be coated with the aqueous coating in the same bath. Here, for example, any desired mix of substrates with metallic surfaces, selected from cast iron, steel, aluminium, aluminium alloys, magnesium alloys, zinc and zinc alloys, can be coated simultaneously and/or successively according to the invention, it being possible for the substrates to be at least partially coated with metal and/or to consist at least partially of at least one metallic material.

Provided at least one other component and/or traces of other substances are not present, the remainder to 1000 g/l consists of water or of water and at least one organic solvent such as ethanol, methanol, isopropanol or dimethylformamide (DMF). Preferably, in most embodiments, the organic solvent content is particularly low or zero. Because of the hydrolysis of the at least one silane present, a content especially of at least one alcohol, e.g. ethanol and/or methanol, can appear. It 1.0 is particularly preferable not to add any organic solvent.

The composition is preferably free or substantially free of all types of particles, or particles with a mean diameter greater than 0.02 μm, which might be added e.g. in the form of oxides such as $SiO_2$.

Only if the coatings are dried e.g. for 5 minutes at 80° C. PMT (peak metal temperature), for 25 minutes at 70° C. PMT or more substantially are these coatings normally insensitive to water, because the condensation of the silanes/silanols/siloxanes/polysiloxanes is more advanced. The extent of drying, which is associated with condensation and makes the siloxane/polysiloxane-containing coating rinse-resistant, varies according to the existence of phases, the coating and the type of rinsing.

The applied siloxane/polysiloxane-containing coating is preferably freshly applied and/or is optionally only slightly dried-on, if at all, when it is rinsed. The coating is preferably rinsed within 20 seconds of application. As the silane-containing aqueous composition is at a temperature ranging preferably from 10 to 50° C., particularly preferably from 15 to 35° C., when it is applied, and because the object to be coated is also at a temperature ranging preferably from 10 to 50° C., particularly preferably from 15 to 35° C., these temperatures are usually not sufficiently high and usually not sufficiently different for rapid drying of the wet film to take place.

The fluid used for rinsing is preferably a liquid particle-free fluid, especially water or a solution. The fluid is particularly preferably water of tap water grade, a pure grade of water such as demineralized water, or a grade of water containing e.g. at least one surfactant capable of homogenizing the wet film. The fluid is at a temperature ranging preferably from 10 to 50° C., particularly preferably from 15 to 35° C. It can wet the objects, coated with the wet film, by dipping in a bath and/or in a liquid jet or film, by spraying, by atomization or by a similar form of wetting in the liquid film and/or jet of a rinsing ring. Preferably, the liquid jet or film impinges on the silane/silanol/siloxane/polysiloxane-containing coating with a pressure not exceeding 2 bar.

The composition is preferably poor in, substantially free of or free of larger contents or contents exceeding 1 g/l of water hardeners such as calcium. The aqueous composition is preferably free of or poor in lead, cadmium, chromate, cobalt, nickel and/or other toxic heavy metals. Preferably, such substances are not deliberately added, although at least one heavy metal, dissolved out of a metallic surface, can be entrained e.g. from another bath and/or can occur as an impurity. The composition is preferably poor in, substantially free of or totally free of bromide, chloride and iodide, since these can contribute to corrosion under certain circumstances.

The layer thickness of the coatings produced according to the invention ranges preferably from 0.005 to 0.3 μm, particularly preferably from 0.01 to 0.25 μm and very particularly preferably from 0.02 to 0.2 μm, and is frequently about 0.04 μm, about 0.06 μm, about 0.08 μm, about 0.1 μm, about 0.12 μm, about 0.14 μm, about 0.16 μm or about 0.18 μm. The coatings containing organic monomer, oligomer, polymer, copolymer and/or block copolymer are often somewhat thicker than those that are free or almost free thereof.

Preferably, the composition forms a coating with a layer weight which, based only on the titanium and/or zirconium content, ranges from 1 to 200 mg/m$^2$, calculated as elemental titanium. This layer weight ranges particularly preferably from 5 to 150 mg/m$^2$ and very particularly preferably from 8 to 120 mg/m$^2$ and, in particular, is about 10, about 20, about 30, about 40, about 50, about 60, about 70, about 80, about 90, about 100 or about 110 mg/m$^2$.

Preferably, the composition forms a coating with a layer weight which, based only on siloxanes/polysiloxanes, ranges from 0.2 to 1000 mg/m$^2$, calculated as the corresponding extensively condensed polysiloxane. This layer weight ranges particularly preferably from 2 to 200 mg/m$^2$ and very particularly preferably from 5 to 150 mg/m$^2$ and, in particular, is about 10, about 20, about 30, about 40, about 50, about 60, about 70, about 80, about 90, about 100, about 110, about 120, about 130 or about 140 mg/m$^2$.

As an alternative to the process sequence proposed hitherto, which also forms the basis of the process sequence in Table 1 below, it is possible on the one hand, before the silane pretreatment according to the invention, also to carry out a prerinsing step and/or a first silane coating step with an aqueous composition containing at least one silane, at least one compound selected from fluoride-free compounds of titanium, hafnium, zirconium, aluminium and boron, at least one more highly diluted alkali solution such as NaOH, and/or at least one complex fluoride, and/or on the other hand, after the silage pretreatment according to the invention, to carry out at least one rinsing step with an aqueous composition containing not just water and optionally containing at least one surfactant to homogenize the wet film. It was found, however, that the properties of the coatings produced with such a prerinsing and/or afterrinsing step and with the silane pretreatment according to the invention, if rinsed beforehand, always gave significantly inferior results for all the corrosion and lacquer adhesion values if the prerinsing step was carried out not just with water or water containing highly diluted alkali solution and if the afterrinsing step involved more than water and at least one surfactant.

If necessary, the coating produced with the aqueous composition according to the invention can then be coated with at least one primer, lacquer or adhesive and/or with a lacquer-like organic composition, optionally at least one of these other coatings being cured by heating and/or irradiation.

The metallic substrates coated by the process according to the invention can be used in the automobile industry, for railway vehicles, in the aerospace industry, in apparatus engineering, in mechanical engineering, in the building industry, in the furniture industry, for the manufacture of crash barriers, lamps, profiles, sheathing or hardware, for the manufacture of car bodies or body parts, individual components or preassembled/connected elements, preferably in the automobile or aeronautical industry, or for the manufacture of appliances or installations, especially household appliances, control devices, testing devices or structural elements.

The existing plants for the cleaning and phosphatizing of car bodies before lacquering often involve the following process stages shown in the middle column of Table 1. The right column shows the process stages which have been recommended, surprisingly, in a shortened process sequence for the cleaning and silane coating of car bodies.

TABLE 1

Typical sequence of process stages for the
phosphatizing of car bodies, or recommended sequence for
the silane coating of car bodies

|  | Phosphatizing | Silane coating |
|---|---|---|
| Alkaline cleaning 1 | heated | heated |
| Alkaline cleaning 2 | heated | heated |
| Rinsing 1 | tap water | tap water |
| Rinsing 2 | tap water | demin. water |
| Activation | very often, with Ti or Zn phosphate | (n/a) |
| Rinsing 3 | optional, if not previously activated | (n/a) |
| Pretreatment | phosphatizing, heated | silane coating |
| Rinsing 4 | tap water | demin. water |
| Rinsing 5 | demin, water | demin. water |
| Afterrinsing solution | optional | (n/a) |
| Rinsing 6 | demin. water | (n/a) |
| Rinsing ring | optional | (n/a) |

It has also been shown, surprisingly, that it is not only possible to use certain solutions, based not just on silane, to produce coatings which, even without more substantial drying of the freshly applied coating, are not only sufficiently rinse-resistant to water, but also have somewhat better layer properties than comparable thoroughly dried coatings. Apparently, the silane-based coatings that are not more substantially dried are more reactive than a lacquer or a lacquer-like composition, e.g. cathodic dip lacquer, and therefore exhibit an adequate adhesion. This makes it possible to dispense with the drying step hitherto regarded as necessary, and with the drying channel that is possibly more than 10 meters long.

Given that the development of the zinc/manganese/nickel phosphatizing of car bodies has spanned several decades, the phosphate layers of this type produced today are of extremely high quality. Nevertheless, contrary to expectation, it was possible to achieve the same high-quality properties with the silane-containing coatings.

Surprisingly, the process according to the invention makes it possible to carry out the pretreatment of car bodies with silane-based solutions, using relatively small contents of the aqueous compositions, without impairing the quality of the coatings. If, however, markedly larger contents of the bath components are chosen, this increases the costs but the quality of the coatings produced cannot usually be improved any further.

The process according to the invention makes it possible to reduce the pretreatment step of 3 to 5 minutes in the phosphatizing process to approx. 2 minutes in the silane-based coating process, and to dispense with heating, as in the phosphatizing process, to temperatures often ranging from 50 to 60° C. However, if the composition is lower, the bath is preferably heated to temperatures ranging from 15 to 25° C.

The process according to the invention makes it possible not only to carry out the pretreatment of car bodies in shorter plants that are appreciably less expensive to operate, but, also to work in a manner that is considerably friendlier to the environment, because the amounts of slurry containing heavy metal that has to be disposed of can be minimized, because water can be circulated under greater pressure and also because the water throughput can be markedly reduced. This affords a pronounced reduction both in the consumption of chemicals and in the treatment costs because the amount of slurry obtained is less than 1% of that previously obtained from phosphatizing, based on the metallic surface to be coated, so the cost of disposing of chemical waste is greatly reduced.

An addition of manganese has surprisingly proved particularly advantageous: Although apparently no or almost no manganese compound is deposited on the metallic surface, the addition greatly promotes the deposition of silane/silanol/siloxane/polysiloxane on the metallic surface. When adding nitroguanidine, it was found, surprisingly, that the optical characteristics of the coated metallic sheets are very uniform, especially on sensitive surfaces such as sandblasted iron or steel surfaces. Unexpectedly, an addition of nitrite markedly reduced the rusting tendency of steel substrates. It was found, surprisingly, that every addition mentioned in the present patent application as having a significantly positive effect has an additive effect on improving the coating according to the invention: Choosing several additions, in a similar manner to a modular system, enables the different properties, especially of a multimetal system, to be further optimized, It has now been found, surprisingly, that a good multimetal treatment with a single aqueous composition is only possible if a complex fluoride has been used, and that a very good multimetal treatment with a single aqueous composition is only possible if at least two different complex fluorides are used, e.g. those based on titanium and zirconium. In a very wide variety of experiments, the results obtained for complex fluorides used individually were never as good as those obtained for the combination of these two complex fluorides, independently of what other additions were made.

The possibility of such a large increase in quality of aqueous compositions containing silane/silanol/siloxane/polysiloxane could not be anticipated. Surprisingly, however, a marked increase in the level of quality in all tests was also found when using aqueous compositions based on a silane and only one titanium-based or zirconium-based complex fluoride.

It was further surprising that, when, testing the lacquer adhesion, stone chip resistance scores of 1 or 2 were obtained, even on steel, when a composition containing at: least one silane and at least one complex fluoride was applied by the process according to the invention: Steel has proved to be the most problematic material for aqueous compositions based on a silane and only one titanium-based or zirconium-based complex fluoride, especially in terms of the corrosion resistance (cf., for example, E 5).

In the case of aluminium and aluminium alloys, experience shows that the CASS test is problematic, but this also turned out markedly better than expected with the compositions according to the invention.

EXAMPLES AND COMPARATIVE EXAMPLES

The Examples according to the invention (E) and Comparative Examples (CE) described below are intended to illustrate the subject matter of the invention in greater detail.

The aqueous bath compositions are prepared as mixtures according to Table 2 using already prehydrolysed silanes. They each contain predominantly one silane and optionally also have small contents of at least one other similar silane, where here again the word silane is used rather than silane/silanol/siloxane/polysiloxane by way of simplification, and where normally these various compounds, sometimes in a larger number of similar compounds, also pass through into the formation of the coating, so there are often several similar compounds present in the coating as well. Depending on the silane, the prehydrolysis step can also take several days at room temperature, with vigorous stirring, if the silanes to be used are not already present in prehydrolysed form. The prehydrolysis of the silane is carried out by placing the silane in excess water and optionally catalysing with acetic acid. Acetic acid was added in only a few embodiments for the sole purpose of adjusting the pH. In some embodiments, acetic acid is already present as a hydrolysis catalyst. Ethanol is formed in the hydrolysis, but is not added. The finished mixture is used fresh.

Then, for each test, at least 3 sheets of cold-rolled steel (CRS), aluminium alloy Al 6016, steel hot-dip galvanized or electrogalvanized on both sides, or Galvaneal® (ZnFe layer on steel), previously cleaned with an aqueous alkaline cleaner and rinsed with industrial water and then with demineralized water, are brought into contact on both sides with the appropriate treatment liquid at 25° C. by spraying, dipping or rollcoater treatment. Immediately thereafter, the sheets pretreated in this way are briefly rinsed with demineralized water. The sheets of the Comparative Examples are dried at 90° C. PMT and then lacquered with a cathodic automobile dip lacquer (CDL). The sheets of the Examples according to the invention, however, are rinsed immediately after the silane pretreatment and dipped in the CDL bath immediately after rinsing. These sheets were then provided with a complete commercial automotive lacquer system (filler, covering lacquer, transparent lacquer; overall thickness of stacked layers, including CDL, approx. 105 μm) and tested for their corrosion protection and lacquer adhesion. The compositions and properties of the treatment baths and the properties of the coatings are collated in Table 2.

The organofunctional silane A is an amino-functional trialkoxysilane and has one amino group per molecule. Like all the silanes used here, it is in extensively or almost completely hydrolysed form in the aqueous solution. The organofunctional silane B has one terminal amino group and one ureido group per molecule. The non-functional silane C is a bis-trialkoxysilane; the corresponding hydrolysed molecule has up to 6 OH groups on two silicon atoms.

The complex fluorides of aluminium, silicon, titanium or zirconium are used extensively in the form of an $MeF_6$ complex, but the complex fluorides of boron are used extensively in the form of an $MeF_4$ complex. Manganese is added to the particular complex fluoride solution as metallic manganese and dissolved therein. This solution is mixed with the aqueous composition. If no complex fluoride is used, manganese nitrate is added. The silylated epoxy polymer has a low content of $OH^-$ and isocyanate groups, so it can also subsequently be chemically crosslinked at temperatures above 100° C.

The silanes present in the aqueous composition—concentrate and/or bath—are monomers, oligomers, polymers, copolymers and/or reaction products with other components due to hydrolysis reactions, condensation reactions and/or other reactions. The reactions take place especially in the solution, during drying or optionally also during curing of the coating, especially at temperatures above 70° C. All the concentrates and baths proved to be stable for one week without undergoing changes or precipitations. No ethanol was added. Ethanol contents in the compositions originate only from chemical reactions.

In the majority of Examples and Comparative Examples, the pH is adjusted with ammonia if at least one complex fluoride is present and with an acid in other cases. All the baths have a good solution quality and almost always a good stability. There are no precipitations in the baths. In the Examples according to the invention and the Comparative Examples, the coating pretreatment with the silane-containing solution is immediately followed firstly by one brief rinse with demineralized water. The freshly applied wet film was not able to dry on more substantially because it was rinsed within 5 seconds of application of the silane-containing coating. Both the freshly coated substrate and the rinsing water were at room temperature. A rinse was necessary to prevent substances in the pretreatment solution from being introduced into the subsequent lacquer bath. The freshly rinsed, coated substrate was then immediately dipped in the cathodic dip lacquer, so no further drying could occur. Whereas the coated sheets of the Examples according to the invention, were coated with a cathodic dip lacquer immediately after rinsing, without intermediate drying, those of the Comparative Examples were dried in an oven for 5 minutes at 120° C. immediately after rinsing.

Because of the interference colours, only the coatings on steel can be significantly examined visually, allowing an assessment of the homogeneity of the coating. The coatings without any complex fluoride content are very inhomogeneous. Surprisingly, a coating with titanium complex fluoride and zirconium complex fluoride proved to be markedly more homogeneous than when only one of these complex fluorides had been applied. An addition of nitroguanidine, nitrate or nitrite likewise improves the homogeneity of the coating. In some cases the layer thickness increases with the concentration of these substances.

TABLE 2

Bath compositions in g/l, based on solids contents or, in the case of silanes, on the weight of the hydrolysed silanes; residual content: water and usually a very small amount of ethanol; process data and properties of the coatings

| Example/CE | CE 1 | E 1 | CE 2 | E 2 | CE 3 | E 3 | CE 4 | E 4 | CE 5 | E 5 | CE 6 | E 6 | CE 7 | E 7 | CE 8 | E 8 | CE 9 | E 9 |
|---|---|---|---|---|---|---|---|---|---|---|---|---|---|---|---|---|---|---|
| Organofunct. silane A | 0.2 | 0.2 | 0.2 | 0.2 | 0.2 | 0.2 | 0.2 | 0.2 | 0.2 | 0.2 | 0.1 | 0.1 | 0.3 | 0.3 | 0.2 | 0.2 | 0.2 | 0.2 |
| $H_2TiF_6$ as Ti | — | — | 0.2 | 0.2 | — | — | 0.2 | 0.2 | 0.2 | 0.2 | 0.1 | 0.1 | 0.3 | 0.3 | 0.2 | 0.2 | 0.2 | 0.2 |
| $H_2ZrF_6$ as Zr | — | — | — | — | 0.2 | 0.2 | 0.2 | 0.2 | 0.2 | 0.2 | 0.1 | 0.1 | 0.3 | 0.3 | 0.4 | 0.4 | 0.2 | 0.2 |
| Mn | — | — | — | — | — | — | — | — | 0.3 | 0.3 | — | — | — | — | 0.3 | 0.3 | — | — |
| Silylated epoxy polymer | — | — | — | — | — | — | — | — | — | — | — | — | — | — | — | — | 1.0 | 1.0 |
| pH | 10.5 | 10.5 | 4 | 4 | 4 | 4 | 4 | 4 | 4 | 4 | 4 | 4 | 4 | 4 | 4 | 4 | 4 | 4 |
| Layer weight, mg/m², of silanol and metal | 10-20 | 10-20 | 20-50 | 20-50 | 20-50 | 20-50 | 20-50 | 20-50 | 20-60 | 20-60 | 10-40 | 10-40 | 30-80 | 30-80 | 30-80 | 30-80 | 50-100 | 50-100 |
| BMW cross-cut test: score | | | | | | | | | | | | | | | | | | |
| Steel | 4 | 3 | 5 | 5 | 3 | 2 | 2 | 1 | 1 | 0 | 2 | 1 | 1 | 1 | 1 | 0 | 1 | 1 |
| E-zinc on steel | 3 | 3 | 4 | 3 | 4 | 3 | 1-2 | 1 | 1 | 0 | 1 | 1 | 1 | 1 | 1 | 1 | 0 | 0 |

TABLE 2-continued

Bath compositions in g/l, based on solids contents or, in the case of silanes, on the weight of the hydrolysed silanes; residual content: water and usually a very small amount of ethanol; process data and properties of the coatings

| Example/CE | CE 1 | E 1 | CE 2 | E 2 | CE 3 | E 3 | CE 4 | E 4 | CE 5 | E 5 | CE 6 | E 6 | CE 7 | E 7 | CE 8 | E 8 | CE 9 | E 9 |
|---|---|---|---|---|---|---|---|---|---|---|---|---|---|---|---|---|---|---|
| Hot-dip zinc on steel | 2 | 2 | 4 | 3 | 4 | 3 | 1 | 0 | 0 | 0 | 1 | 0 | 0-1 | 0-1 | 0-1 | 0 | 0 | 0 |
| Al 6016 | 2 | 2 | 2 | 2 | 2 | 2 | 1 | 1 | 1 | 0 | 2 | 1 | 1 | 1 | 1 | 0 | 1 | 1 |
| Galvaneal ® 10 VDA cycles, mm disbonding | 1 | 1 | 1 | 1 | 2 | 1 | 1 | 0 | 1 | 0 | 1 | 0 | 0 | 0 | 0 | 0 | 0 | 0 |
| Steel | 8 | 8 | 7 | 5 | 4 | 3 | 3 | 2.5 | 2 | 1 | 3.5 | 2 | 1.5 | 1.5 | 1.5 | <1 | 2.5 | 2 |
| E-zinc on steel | 5 | 4 | 3 | 2.5 | 4 | 4 | 2 | 1 | 1 | <1 | 3 | 1.5 | 1.5 | 1 | 1 | <1 | 1 | <1 |
| Hot-dip zinc on steel | 4 | 4 | 2.5 | 2 | 3.5 | 3 | <1 | <1 | <1 | <1 | 1.5 | 1 | 1 | 1 | 1 | <1 | <1 | <1 |
| Galvaneal ® Stone chip resistance after VDA stress: score | 2 | 2 | 2 | 1 | 1.5 | 1.5 | <1 | 0 | <1 | <1 | 1 | 1 | <1 | <1 | <1 | <1 | 0 | 0 |
| Steel | 5 | 5 | 4 | 4 | 4 | 3 | 2-3 | 1 | 1 | 1 | 2 | 2 | 2 | 1 | 1-2 | 1 | 1 | 0-1 |
| E-zinc on steel | 5 | 4 | 3 | 2 | 4 | 3 | 2 | 1 | 1 | 1 | 2 | 1 | 1-2 | 0 | 1 | 0 | 1 | 0-1 |
| Hot-dip zinc on steel | 5 | 4 | 3 | 2 | 4 | 3 | 1 | 0 | 1 | 0 | 1 | 1 | 1 | 0 | 1 | 0 | 0 | 0 |
| Galvaneal ® Salt spray test, 1008 h | 4 | 4 | 2 | 2 | 3 | 2 | 1-2 | 0 | 1 | 0 | 1 | 0-1 | 0 | 0 | 0 | 0 | 0 | 0 |
| Steel CASS test, mm disbonding | 7 | 6 | 4 | 4 | 3.5 | 3 | 2 | 1.5 | 1.5 | <1 | 2.5 | 2 | 1.5 | <1 | 1.5 | <1 | 1 | 1 |
| Al 6016 | 6 | 6 | 3.5 | 3 | 3.5 | 3 | 2.5 | 2.5 | 1.5 | 1 | 2.5 | 2 | 1.5 | 1 | 1.5 | 1 | 1.5 | 1 |

When the different metallic surfaces which have been coated are considered as a whole, all the Examples show a significant improvement in comparison with the respective Comparative Example, the same bath composition being applied each time, in one case with subsequent drying (as Comparative Example, CE) and in the other case without subsequent drying (as Example according to the invention, E).

It was surprising that this improvement, which brings only a limited improvement to already good coating results, is systematically improved, by not drying after application of the aqueous composition. It is therefore possible, surprisingly, to achieve, by not drying, a significant improvement which is universally almost independent of the chemical composition of the aqueous bath. It was further surprising that this improvement occurred both in the case of the solutions containing only silane, and in the case of the solutions containing silane and complex fluoride and optionally also manganese ions. It is therefore assumed that a similar constant improvement from drying to not, drying also occurs in the case of solutions of similar composition or in the case of solutions containing several different substances, based on silane or on silane and complex fluoride. The greater the number of different substances present and the larger their inherently small contents, the better the corrosion resistance and lacquer adhesion can be, provided any optimum is not exceeded.

The layer weight varies not only with the contents of the individual constituents of the aqueous solutions, but also with the particular type of metallic surface being coated. Choosing the bath components and their contents makes it possible overall to achieve a very marked improvement in the corrosion resistance and lacquer adhesion.

Over the short period of use, all the bath compositions are found to be stable and satisfactory to apply. There are no differences in behaviour, visual impression or test results between the different Examples and Comparative Examples which can be attributed to the treatment conditions, e.g. application by spraying, dipping or rollcoater treatment. The films formed are transparent and almost all are extensively homogeneous. They do not colour the coating. The films formed are transparent and almost all are extensively homogeneous. The structure, gloss and colour of the metallic surface appear to be only slightly changed by the coating. If a titanium and/or zirconium complex fluoride is present, iridescent layers are formed, especially on steel surfaces. Combining several silanes has not so far brought about a significant improvement in the corrosion protection, but this cannot be ruled out. Furthermore, a content of $H_3AlF_6$ was found on aluminium-rich metallic surfaces due to corresponding reactions in the aqueous composition. Surprisingly, however, combining two or three complex fluorides in the aqueous composition has proved extremely beneficial.

The layer thickness of the coatings produced in this way also dependent on the type of application, which was initially varied in specific experiments—ranged from 0.01 to 0.16 μm and usually from 0.02 to 0.12 μm and was often up to 0.08 μm, being markedly greater when organic polymer was added.

Given that the development of the zinc/manganese/nickel phosphatizing of car bodies has spanned several decades, the phosphate layers of this type produced today are of extremely high quality. Nevertheless, contrary to expectation, it was possible to achieve the same high-quality properties with silane-containing coatings by means of aqueous silane-containing compositions that have only been in use for a few years, even though a greater effort was required.

The corrosion protection scores in the cross-cut test according to DIN EN ISO 2409, after storage for 40 hours in 5% NaCl solution according to BMW specification GS 90011, range from 0 to 5, 0 representing the best values. In the salt spray/condensation water alternation test over 10 cycles according to VDA test sheet 621-415 with alternating corrosion stress between salt spray test, perspiration water test and drying interval, the disbonding is measured on one side from the scratch outwards and reported in mm, the disbonding ideally being as small as possible. In the stone chip resistance test according to DIN 55996-4, the coated metallic sheets are bombarded with scrap steel after the aforementioned VDA alternation test over 10 cycles: The damage picture is characterized by scores from 0 to 5, 0 representing the best results. In the salt spray test according to DIN 50021 SS, the coated sheets are exposed for up to 1008 hours to an atomized corrosive sodium chloride solution; the disbonding is then measured in mm from the scratch outwards, the scratch being made with a standard gouge down to the metallic surface, and the disbonding ideally being as small as possible. In the CASS test according to DIN 50021 CABS, the coated sheets made of an aluminium alloy are exposed for 504 hours to an atomized special corrosive atmosphere; the disbonding is then measured in mm from the scratch outwards and ideally is as small as possible.

Other experiments on car body elements have shown that the electrochemical conditions of the CDL bath may be very slightly adaptable to the different kind of coating, but otherwise that the outstanding properties obtained in laboratory experiments can be reproduced on car body elements.

The invention claimed is:

1. A process for forming a silane pretreatment layer, the process comprising
    contacting a metallic surface with a first composition to form a first coating, wherein said first composition comprises:
    water, and
    a) a compound capable of condensation selected from the group consisting of a silane, a silanol, a siloxane and a polysiloxane, and at least one of
    b) a compound containing titanium, hafnium, zirconium, aluminum or boron, or
    c) a cation selected from a metal of subgroup 1 to 3 and 5 to 8, which subgroups include the lanthanides, and of main group 2 of the periodic table of the elements; and
    d) a hydrophobicity adjusting agent; and
    rinsing the first coating while it is wet with an aqueous surfactant composition to form the silane pretreatment layer.

2. The process of claim 1, further comprising applying a subsequent coating to the silane pretreatment layer.

3. The process according to claim 2, wherein the subsequent coating is selected from the group consisting of a conversion coating, a coating resulting from the application of an after-rinsing solution, a coating based on a lacquer, a primer and an adhesive.

4. The process of claim 2, further comprising applying the subsequent coating within three minutes of the rinsing step that forms the silane pretreatment layer.

5. The process according to claim 1, wherein the first composition has a pH greater than 1.5 and less than 9.

6. The process according to claim 1, wherein compound a) is in the range from 0.005 to 80 g/l, calculated as the corresponding silanols.

7. The process according to claim 1, wherein compound a) comprises at least one of an amino group, an urea group or an ureido group.

8. The process of claim 1, wherein prior to the contacting of the metallic surface and the first composition, the metallic surface is pre-rinsed and/or a first silane coating is applied to the metallic surface by contacting the metallic surface with a first aqueous composition containing at least one silane, silanol, siloxane, and/or polysiloxane, at least one compound selected from fluoride-free compounds of titanium, hafnium, zirconium, aluminum and boron, at least one alkali solution, or at least one complex fluoride.

9. The process of claim 1, wherein the coating comprises at least one of organic monomers, oligomers, polymers, copolymers and block copolymers each comprising silicon.

* * * * *

UNITED STATES PATENT AND TRADEMARK OFFICE
CERTIFICATE OF CORRECTION

| | | |
|---|---|---|
| PATENT NO. | : 9,879,349 B2 | Page 1 of 1 |
| APPLICATION NO. | : 13/326633 | |
| DATED | : January 30, 2018 | |
| INVENTOR(S) | : Kolberg et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1668 days.

Signed and Sealed this
Twenty-third Day of April, 2019

Andrei Iancu
*Director of the United States Patent and Trademark Office*